United States Patent [19]

Button

[11] 4,170,182

[45] Oct. 9, 1979

[54] FOLDING TABLE STRUCTURE

[76] Inventor: Millard J. Button, 108 Fairmount Ave., Liverpool, N.Y. 13088

[21] Appl. No.: 883,713

[22] Filed: Mar. 6, 1978

[51] Int. Cl.² ............................................ F16M 13/00
[52] U.S. Cl. .................................... 108/106; 108/111; 248/421
[58] Field of Search ................. 108/96, 106, 111, 116, 108/145; 248/421, 440; 403/102

[56] References Cited

U.S. PATENT DOCUMENTS

| 909,336 | 1/1909 | Riedy | 108/106 X |
|---|---|---|---|
| 1,862,010 | 6/1932 | Ehrlich | 108/106 X |
| 1,981,285 | 11/1934 | Rechlicz | 248/421 |
| 2,593,750 | 4/1952 | Greitzer | 248/421 X |
| 3,403,936 | 10/1968 | Young | 248/421 X |

Primary Examiner—James C. Mitchell
Attorney, Agent, or Firm—Charles S. McGuire

[57] ABSTRACT

A folding work table, or the like, having two rectangular platforms joined by four foldable legs with a pair of lateral support members on each side for releasably locking the legs in an erected position. Each leg is hingedly connected at its opposite ends to the perspective platforms and is divided at an intermediate point into hingedly connected upper and lower sections. Unique coupling means are provided for releasably maintaining the lateral supports in locking engagement with the sections. Also, a brace maintains one end of the upper platform in a partly folded position to prevent binding as the lateral supports are removed with locking engagement with the leg sections, whereby the structure may easily be moved between erected and folded positions by a single individual. The lower platform is mounted upon wheels or casters and a movable handle is provided for movement of the entire structure in either the erected or folded positions.

10 Claims, 8 Drawing Figures

FOLDING TABLE STRUCTURE

BACKGROUND OF THE INVENTION

The present invention relates to folding work tables or platforms and, more specifically, to a structure having a work surface movable between elevated and lowered horizontal positions.

It is frequently desirable to provide means for moving a work table from place to place, for example by mounting it upon wheels or casters. It is also desirable in some instances to have both a work table having a surface at a desired working height, e.g., about 30 inches, and a dolly for moving articles placed on the surface thereof at a comparatively low height, e.g., a foot or less off the floor.

It is a principal object of the present invention to provide a wheel supported structure having a rectangular work surface which may be selectively positioned in a plurality of horizontal planes by means of folding legs.

A further object is to provide a folding structure which may easily be converted between work table and dolly by manipulation of elements by a single individual.

Still another object is to provide a foldable work table which is strong and stable in the erected position and quickly convertible to a low dolly for transporting both the structure and items carried thereon from place to place.

Other objects will in part be obvious and will in part appear hereinafter.

SUMMARY OF THE INVENTION

In accordance with the foregoing objects, the invention comprises a structure having two rectangular platforms joined by four legs, each of which are divided into two hingedly connected sections. The lower platform is supported on wheels or casters for easy movement of the entire structure with the aid of a detachable handle. The upper and lower ends of the legs are pivotally movable with respect to the upper and lower platforms as the leg sections are moved about their hinged connections between erected and folded positions.

A pair of lateral support members are provided on each side of the structure for stabilizing and maintaining the leg sections in the erected position. One support member is pivotally attached at one end to a respective one of the legs near the end thereof which is connected to the upper platform. A fixed pin extends from the other end of each lateral support member. The upper and lower leg sections have portions which overlap adjacent the hinged connection and the overlapping portions have openings which are in registration when the leg sections are in the erected position. The fixed pin on one of the lateral support members is inserted through the openings to lock the leg sections in the erected position.

Removable locking pins are inserted through an opening in each of the fixed pins to maintain their engagement with the leg sections. The locking pins are so configured and arranged relative to the fixed pins and leg sections that gravity and vibrations serve to engage the locking pins more tightly, making inadvertent withdrawal virtually impossible. In order to move the leg sections to their folded position, the two locking pins at one end of the structure are manually withdrawn from the fixed pins and the lateral supports are removed from engagement with the legs at that end. These two legs are then moved toward the folded position as the upper platform is lowered at one end until being temporarily supported by a removable brace in an intermediate position with the legs partly folded.

The locking pins are withdrawn from the fixed pins, and the latter from leg sections at the other end of the structure. Supporting the upper platform in the intermediate position at one end prevents binding of the locking pins and fixed pins at the other end, thereby facilitating their withdrawal and movement of the legs to the fully folded position. Upon removal of the brace, the legs at the first-mentioned end may likewise be fully folded with the upper and lower sections in superposed relation along their lengths. The upper platform is then only a few inches higher than the lower platform and the structure may conveniently be moved and used as a transporting dolly. Movement back to the erected position is effected in reverse manner.

DETAILED DESCRIPTION

Figure 1:
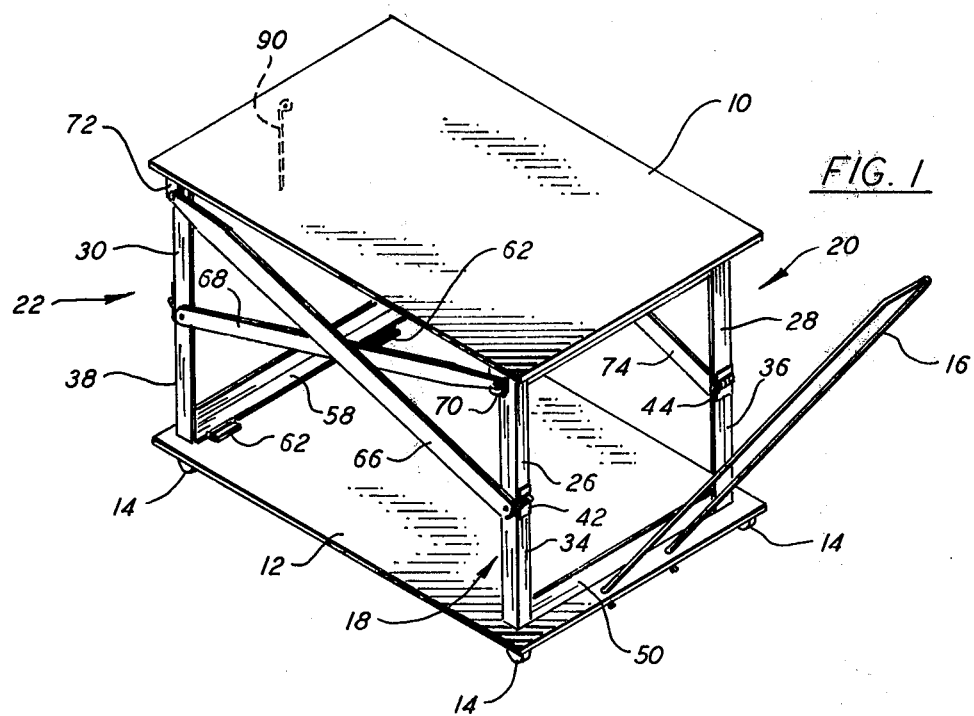
FIG. 1 is a perspective view of the structure of the invention shown in the fully erected position.

Referring now to the drawings, the preferred embodiment of the invention is seen to include upper and lower rectangular platforms 10 and 12, respectively, the latter being supported upon small wheels or casters 14 for movement by means of detachable handle 16. Although shown as a one-piece, U-shaped structure having bent-over end portions for insertion through openings in lower platform 12, it is apparent that handle 16 may take a variety of forms and may be permanently or detachably connected to the structure by any desired means. The wheels or casters at the front of the structure, i.e., the end at which the handle is attached are preferably of the pivoting type with means for locking in a fixed position, while those at the rear may be non-pivoting.

Platforms 10 and 12 are connected by four legs, those at the front being denoted by reference numerals 18 and 20, those at the rear by reference numerals 22 and 24. Each of the four legs is divided into two hingedly connected sections. The upper sections of the four legs are denoted by reference numerals 26, 28, 30 and 32, and the lower sections by numerals 34, 36, 38 and 40, respectively. Hinges 42 and 44 connect the upper and lower sections of front legs 18 and 20, and hinges 46 and 48 connect the upper and lower sections of rear legs 22 and 24.

Lower sections 34 and 36 of front legs 18 and 20 are fixedly attached at their lower ends to cross member 50 which is L-shaped in cross section, as are each of legs 18, 20, 22 and 24. Cross member 50 is attached by hinges 52 to the upper surface of lower platform 12 for folding movement relative thereto of cross member 50, and thereby lower leg sections 34 and 36, about the axis of hinges 52. Upper sections 26 and 28 of front legs 18 and 20 are fixedly attached to cross member 54 which is attached to the lower surface of upper platform 10 by hinges 56 for similar folding movement. The lower and upper sections of the rear legs are fixedly attached at their ends to lower and upper cross members 58 and 60, respectively. Lower cross member 58 is attached to lower platform 12 by hinges 62, and upper cross member 60 is attached to upper platform 10 by hinges 64.

Figure 5:
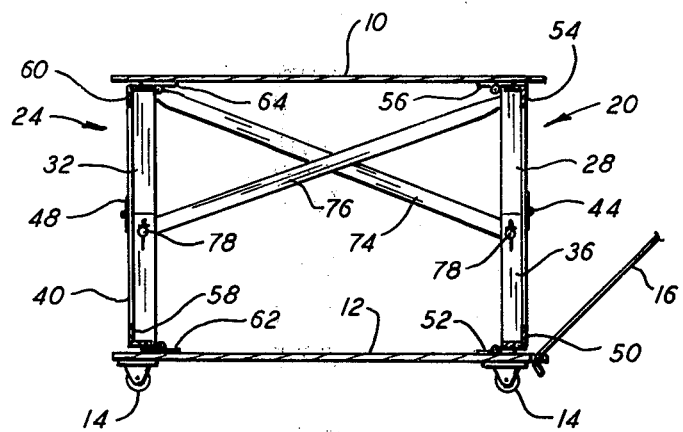
FIG. 5 is a side elevational view on the line 5—5 of FIG. 6.

A first pair of lateral support members 66 and 68 are pivotally attached at one end of each to fixed brackets 70 and 72 on the lower side of upper platform 10 on one side of the structure. A second pair of identical support members 74 and 76 are similarly attached to fixed brackets on the other side. At the ends opposite their pivotal attachments to the fixed brackets, each of the lateral support members carries a fixed pin. The only fixed pins which are shown in the drawings are those associated with lateral supports 74 and 76, which are seen in FIG. 5 and both denoted by reference numeral 78.

Figure 3:
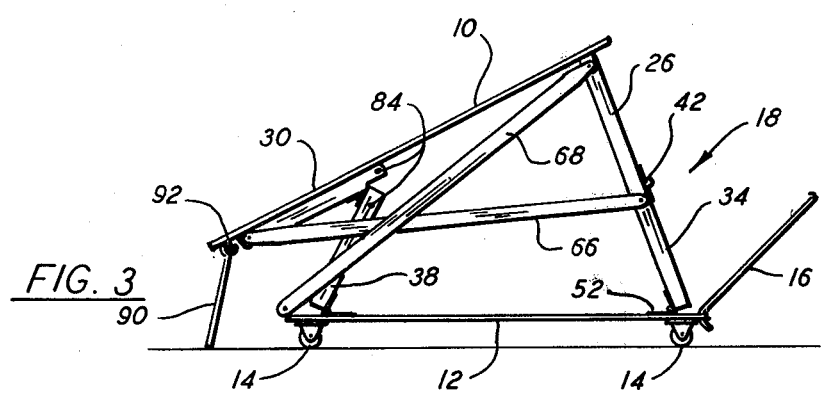
FIG. 3 is a side elevational view showing the structure in a partly folded position.
Figure 7:
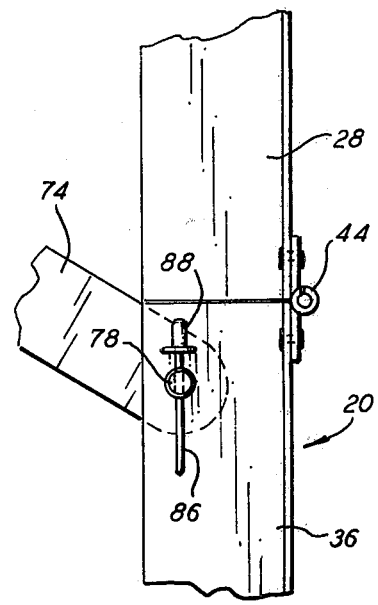
FIG. 7 is an enlarged, fragmentary side elevational view of a portion of the structure.
Figure 6:
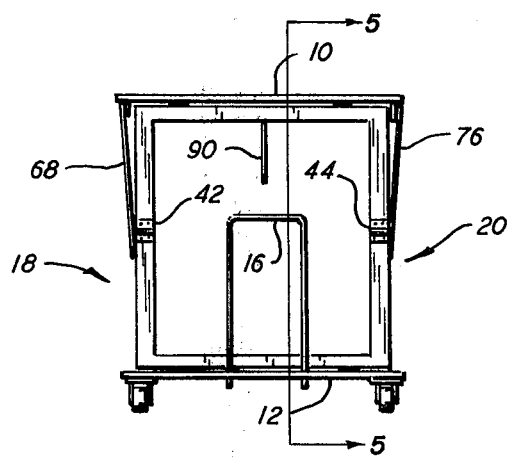
FIG. 6 is a front elevational view.
Figure 8:
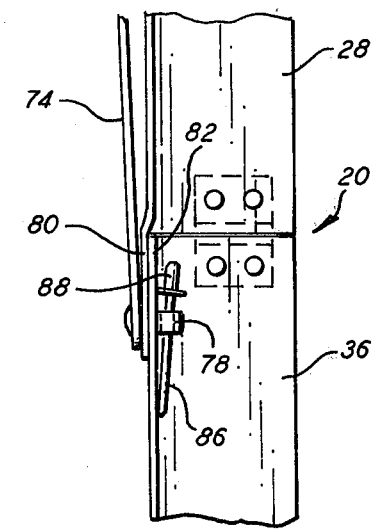
FIG. 8 is a fragmentary, front elevational view of the portion of the structure shown in FIG. 7.

As best seen in the enlarged, fragmentary views of FIGS. 7 and 8, upper section 28 of leg 20 includes a downwardly extending portion 80 which overlaps the uppermost portion 82 of lower section 36 on the non-hinged sides of the leg, each of the four legs being similarly configured. The overlapped portions of each leg are provided with openings of slightly larger diameter than fixed pins 78, the openings in sections 30 and 38 of leg 22 are shown in FIG. 3, both denoted by reference numeral 84. Holes 84 are arranged so as to be in registration with one another when the legs are in the erected position, i.e., with the upper and lower sections thereof in end-to-end relation with the portions of each section in over-lapping relation, as in FIGS. 7 and 8.

Each of fixed pins 78 is provided with an opening extending radially therethrough in a position such as to be vertically disposed when the fixed pin extends through the openings in the overlapped portions of the leg sections. A locking pin, such as that shown in FIGS. 7 and 8 and denoted by reference numeral 86, is inserted through the opening in each of fixed pins 78 when the latter are extended through the leg section openings. Each locking pin 86 includes a flanged head portion 88. The relative positions and dimensions of the opening in fixed pins 78, the adjacent portion of the lower leg section, locking pin 86 and head portion 88 thereof are such that as the tip of the locking pin is moved downwardly through the opening in the fixed pin, head portion 88 and the tip of locking pin 86 contact the surface of the leg section to wedge locking pin 86 into tight engagement with fixed pin 78. Since the locking pins are inserted vertically downward with the flanged head portion above the fixed pin, any vibration or other movement which might tend to dislodge the locking pins instead serves to move them into tighter engagement.

Figure 2:
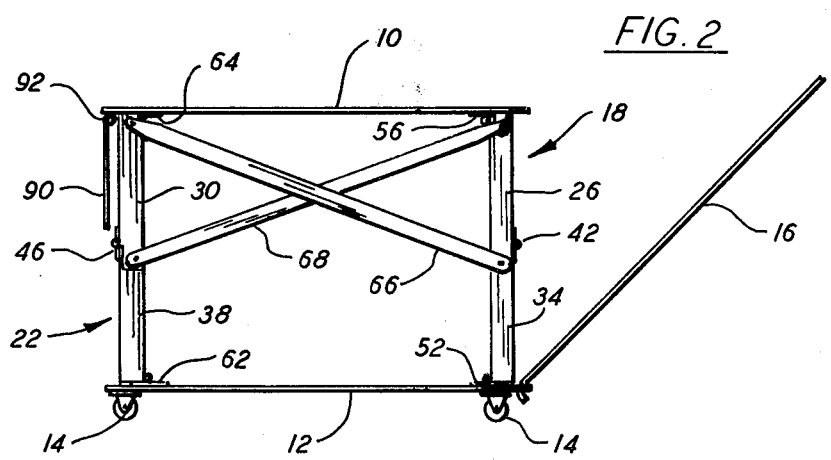
FIG. 2 is a side elevational view of the structure of FIG. 1.

In order to move the structure from the erected position of FIGS. 1 and 2 to the fully folded position of FIG. 3, locking pins 86 are first removed from fixed pins 78 at legs 22 and 24 at the rear of the structure, i.e., the end opposite that at which handle 16 is attached. Fixed pins 78 are then removed from openings 84 in the overlapped portions of legs 22 and 24. The ends of lateral supports 68 and 76 which carry fixed pins 78 may then be laid upon lower platform 12, as in FIG. 3, and legs 22 and 24 may be folded about the hinged connections of the upper and lower sections thereof. Cross members 58 and 64 likewise move about their hinged connections to the lower and upper platforms as the legs are folded.

Figure 4:
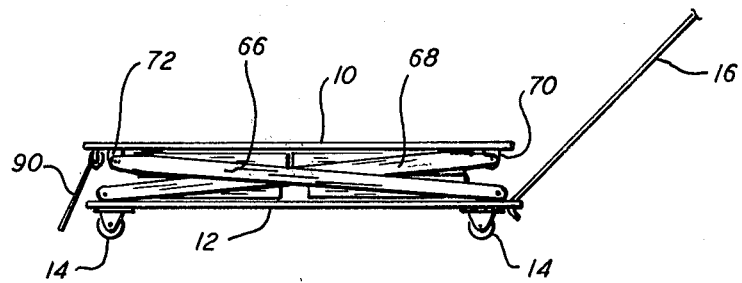
FIG. 4 is a side elevational view showing the structure in the fully folded position.

Brace 90 is connected for freely pivoting movement at 92 upon the lower side of upper platform 10 at the center of the rear edge thereof. As the rear end of the upper platform is lowered during folding movement of legs 22 and 24, the free end of brace 90 is placed on lower platform 12 (or upon the floor) to hold the rear end of platform 10 temporarily in the intermediate position of FIG. 3. Lockings pins 86 are then removed from fixed pins 78 on lateral supports 66 and 74 at legs 18 and 20, the lateral supports are removed from engagement with the legs and placed upon platform 12, and the front end of the structure may be lowered by folding legs 18 and 20. Brace 90 is then removed from engagement with the floor (or with platform 12) and the rear end of the structure may be lowered to the fully folded position of FIG. 4. Holding one end of the upper platform temporarily in an intermediate position prevents binding and consequent difficulty in removing the locking pins and fixed pins from the legs at the other end. If desired, a pair of braces of different lengths may be provided at the rear of the upper platform, or other adjustment means may be provided for altering the height of upper platform 10 in the intermediate position.

Thus, there has been described a folding structure useful as both a work table and transportable dolly. The size and materials of the various elements may be selected in accordance with intended applications. The structure may easily be moved between the erected and folded positions by one individual working alone, even in cases where the structure is relatively large and heavy.

What is claimed is:
1. A folding structure comprising:
(a) upper and lower rectangular platforms;
(b) wheels supporting said lower platform for movement over a surface;
(c) four legs of equal length each hingedly movable at one end about first axes substantially in the plane of the upper side of said lower platform and hingedly movable at the other end about second axes, parallel to said first axes and substantially in the plane of the lower side of said upper platform;
(d) each of said legs being divided intermediate of their ends into upper and lower sections connected for folding movement about axes parallel to both said first and second axes between erected positions, wherein said upper and lower sections are linearly arranged end-to-end, and folded positions, wherein said upper and lower sections are substantially superposed along their lengths;
(e) first and second pairs of lateral support members each attached at one end for pivotal movement about a pair of third axes, near said second axes; and
(f) coupling means for releasably attaching the other end of each of said lateral supports to the leg on the same side and opposite end of the structure at which said one end of the lateral support is pivotally attached, said coupling means including structure for releasably engaging both of said upper and lower sections, thereby maintaining said upper and lower leg sections in said erected position thereof.
2. The invention according to claim 1 wherein said coupling means comprises a fixed pin extending from said other end of each of said lateral supports, and portions of said upper and lower leg sections which are overlapped and having openings which are in registration when said sections are in said erected position, whereby placing said fixed pin through said upper and lower leg section openings locks said upper and lower sections in said erected position.

3. The invention according to claim 2 and further including removable locking pins engageable with each of said fixed pins for securing said lateral supports in locking relation with said upper and lower sections.

4. The invention according to claim 3 wherein said fixed pins include an opening therethrough having a central axis which is vertically arranged when said fixed pins are placed through said upper and lower leg section openings, and said locking pins include a head portion extending laterally therefrom for frictional engagement of said locking pins with said fixed pins and leg sections.

5. The invention according to claim 1 wherein said upper and lower sections of said legs are all of substantially equal length.

6. The invention according to claim 1 and further including a rigid brace having a first end pivotally attached to said upper platform and a length sufficient to maintain one end of said upper platform in an intermediate position with said brace moved about its pivotal attachment to extend generally downward from said upper platform for engagement of the second end of said brace with an underlying support, thereby permitting disengagement of said coupling means from said leg sections at the other end of said platform while said one end thereof is maintained in said intermediate position.

7. The invention according to claim 6 wherein said brace comprises a rod pivotally attached at said one end to the lower side of said upper platform at a point between two of said legs which are pivotally movable about the same axes.

8. The invention according to claim 1 and further including handle means attached to said lower platform for moving said structure upon said wheels.

9. The invention according to claim 1 and further including fixed bracket means attached to said upper platform, said lateral support members being pivotally attached at said one end of each to said bracket means.

10. The invention according to claim 1 and further including a first pair of rigid members, each hingedly connected to the upper side of said lower platform for movement about said first axes, and a second pair of rigid members, each hingedly connected to the lower side of said upper platform for movement about said second axes, two of said legs being fixedly attached at their ends to each of said rigid members.

* * * * *